United States Patent
Neisinger et al.

(10) Patent No.: US 10,749,699 B1
(45) Date of Patent: Aug. 18, 2020

(54) PREDICTIVE INDICATOR BASED ON NETWORK PERFORMANCE

(71) Applicant: Guavus, Inc., San Jose, CA (US)

(72) Inventors: Chris S. Neisinger, Danville, CA (US); Michal Patryk Debicki, Maidenhead (GB)

(73) Assignee: GUAVUS, INC., San Jose, CA (US)

( * ) Notice: Subject to any disclaimer, the term of this patent is extended or adjusted under 35 U.S.C. 154(b) by 0 days.

(21) Appl. No.: 16/583,085

(22) Filed: Sep. 25, 2019

(51) Int. Cl.
| | |
|---|---|
| *H04W 72/00* | (2009.01) |
| *H04L 12/14* | (2006.01) |
| *H04L 12/28* | (2006.01) |
| *H04L 12/803* | (2013.01) |
| *H04L 12/26* | (2006.01) |
| *H04M 15/00* | (2006.01) |

(52) U.S. Cl.
CPC ...... *H04L 12/1485* (2013.01); *H04L 12/1453* (2013.01); *H04L 12/2876* (2013.01); *H04L 43/0811* (2013.01); *H04L 43/0876* (2013.01); *H04L 47/125* (2013.01); *H04M 15/81* (2013.01)

(58) Field of Classification Search
USPC .......................................... 455/460; 370/241
See application file for complete search history.

(56) References Cited

U.S. PATENT DOCUMENTS

| | | | | |
|---|---|---|---|---|
| 9,456,397 | B2* | 9/2016 | Forssell | H04W 60/005 |
| 10,484,487 | B2* | 11/2019 | Fix | H04N 21/26216 |
| 2011/0271309 | A1* | 11/2011 | Chetlur | H04N 21/2402 725/91 |
| 2013/0051239 | A1* | 2/2013 | Meredith | H04W 16/18 370/241 |
| 2014/0325019 | A1* | 10/2014 | Austin | H04L 41/06 709/217 |
| 2017/0331670 | A1* | 11/2017 | Parkvall | H04J 11/0056 |
| 2018/0132138 | A1* | 5/2018 | Senarath | H04W 24/02 |

* cited by examiner

*Primary Examiner* — David Q Nguyen
(74) *Attorney, Agent, or Firm* — Kerr IP Group, LLC (57) ABSTRACT

A network load traffic management component is communicatively coupled to a radio access network (RAN). The network load traffic management component includes a subscriber scoring module and a subscriber scoring database that operates on a server processor and a server memory. The network load traffic management component identifies at least one network event corresponding to a RAN control plane. The network load traffic management component monitors each network event for a session time, in which each session time is associated with each subscriber interacting with the RAN. The network load traffic management component, repeatedly, determines a performance measurement for each network event associated with each session time. The performance measurement for each network event is recorded. A subscriber score is generated based on the performance measurements for each network event. A predictive indicator score is generated based on subscriber scores and behavioral analytics associated with each subscriber.

20 Claims, 5 Drawing Sheets

PREDICTIVE INDICATOR BASED ON NETWORK PERFORMANCE

FIELD

The description relates to a system and method for generating a predictive indicator based on network performance. More specifically, the predictive indicator represents a subscriber score that is calculated based on monitored network events associated with network performance.

BACKGROUND

A Net Promoter Score (NPS) is used to measure customer satisfaction by measuring the loyalty that exists between a consumer and a provider such as a wireless service provider. Generally, the Net Promoter Score is calculated based on responses to a single question and scoring for the response based on a 0 to 10 scale.

Respondents with a score of 9 to 10 are categorized as Promoters. Promoters are likely to buy more, remaining customers for longer, and making more positive referrals to other potential customers. Detractors respond with a score of 0 to 6 and they are believed to be less likely to exhibit the value-creating behaviors of the Promoters. Responses of 7 and 8 are labeled Passives, and their behavior falls between Promoters and Detractors.

The Net Promoter Score may range from −100 to +100. The Net Promoter Score is calculated according to the following formula:
(Number of Promoters−Number of Detractors)/(Number of Responses)*100

For example, if 200 Responses are received for a survey and 50 have a Detractor score (0-6), 80 have a Passive score (7-8) and 70 have a Promoter score (9-10), then the NPS is +10. The calculation is performed by taking the number of Promoters, e.g. 70, and dividing by the total number of responses, 200, which results in 35% Promoters. A similar calculation is performed with the Detractors, which results in 25% Detractors. To obtain the Net Promoter Score the percent of Promoters (35%) is subtracted from the percentage of Detractors (25%) to arrive at the Net Promoter Score of +10.

However, there are various challenges to implement a customer satisfaction program such as NPS. The most significant challenge is that traditional NPS requires costly and obtrusive Question and Answer surveys. Thus, it would be beneficial to provide a customer satisfaction program that is more cost effective.

Another challenge associated with NPS is that the surveys are performed sporadically and only cover a subset of customers. Thus, it would be beneficial to provide a customer satisfaction program that covers the entire customer base and a customer satisfaction program that operates over a continuous period of time.

An additional challenge associated with NPS surveys is that they require framing questions for a human answer or response. It would be beneficial to provide an indicator for a human response to obviate the need for an actual human response.

SUMMARY

A method for determining a predictive indicator based on network performance at regular intervals for each of a plurality of subscribers is described. The method includes a radio access network (RAN) associated with a service provider network. The RAN includes a plurality of base stations, in which each base station has a coverage area. Mobile devices are communicatively coupled to the RAN. A network load traffic management component is communicatively coupled to the RAN. The network load traffic management component includes a subscriber scoring module and a subscriber scoring database that operates on a server processor and a server memory. The method proceeds to identify, with the network load traffic management component, at least one network event corresponding to a RAN control plane. The network load traffic management component monitors each network event for a session time, in which each session time is associated with each subscriber interacting with the RAN. The method then proceeds to repeatedly determine a performance measurement for each network event associated with each session time. The performance measurement is then recorded for each network event over a timeline. Each performance measurement is associated with the session times for each subscriber. A subscriber score is generated based on the plurality of performance measurements for each network event. The network load traffic management component then proceeds to generate a predictive indicator score based on a plurality of subscriber scores and a plurality of behavioral analytics associated with each subscriber.

In the illustrative embodiment, the behavioral analytics includes a mobility attribute. More specifically, the mobility attribute includes at least one of a location for each mobile device, an activity level for each mobile device, at least one used service associated with each mobile device, at least one tariff associated with each mobile device and a revenue associated with each mobile device.

In another illustrative embodiment, the predictive indicator score is associated with a net promoter score. Additionally, the session time in one of the illustrative embodiments includes a call duration.

In yet another illustrative embodiment, the predictive indicator score for each subscriber is used to evaluate a network performance of the radio access network. In a still further embodiment, the network event includes at least one of a registration, a SIP message, a plurality of media traffic and a plurality of bearer traffic. In a yet further embodiment, the performance measurement includes a quality of service.

A system for determining a predictive indicator based on network performance at regular intervals for each of a plurality of subscribers is also described. The system includes a radio access network (RAN), a plurality of mobile devices and a network load traffic management component. The RAN is associated with a service provider network and includes a plurality of base stations, in which each base station has a coverage area. Mobile devices are communicatively coupled to the RAN. The network load traffic management component is communicatively coupled to the RAN. Additionally, the network load traffic management component includes a subscriber scoring module and a subscriber scoring database that operates on a server processor and a server memory. The network load traffic management component identifies at least one network event. The network load traffic management component monitors each network event for a session time, in which each session time is associated with each subscriber interacting with the RAN. Also, the network load traffic management component repeatedly determines a performance measurement for each network event associated with each session time. The network load traffic management component then records the performance measurement for each network event over a timeline. Each performance measurement is associated with each of the plurality of session times for each subscriber. The network load traffic management component generates a subscriber score based on the performance measurements for each network event. Additionally, the network load traffic management component generates a predictive indicator score based on a plurality of subscriber scores and a plurality of behavioral analytics associated with each subscriber.

In one illustrative system embodiment, the behavioral analytics include a mobility attribute, in which the mobility attribute further includes at least one of a location for each mobile device, an activity level for each mobile device, at least one used service associated with each mobile device, at least one tariff associated with each mobile device and a revenue associated with each mobile device. In another illustrative embodiment, the predictive indicator score is associated with a net promoter score.

In another illustrative embodiment, the session time includes a call duration. In yet another illustrative embodiment, the predictive indicator score for each subscriber is used to evaluate a network performance of the radio access network. In a still further embodiment, the network event includes at least one of a registration, a SIP message, a plurality of media traffic and a plurality of bearer traffic. In yet another embodiment, the performance measurement includes a quality of service.

DRAWINGS

The present subject matter will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. Additionally, the methods may vary as to details, order of the actions, or other variations without departing from the illustrative methods disclosed herein.

The systems and methods described herein generate a predictive indicator based on network performance. The predictive indicator is similar to a Net Promoter Score (NPS) because the predictive indicator represents customer satisfaction like a traditional NPS survey. Thus, the predictive indicator is a real-time autonomous measurement that predicts customer satisfaction and approximately predicts the outcome of the traditional NPS survey. For wireless networks, a subscriber rating or score may represent customer satisfaction, which may be provided by an illustrative traditional NPS survey.

The NPS survey requires an obtrusive Question and Answer (Q&A) survey be performed sporadically upon a cross-section of a customer or subscriber base. The NPS survey is performed by a subset of customers and requires human intervention or action. The predictive indicator described obviates the need for costly Q&A surveys, can be performed continuously, can cover an entire customer base and does not require human intervention. Thus, the predictive indicator improves over existing methods of determining network performance by automating these determinations, continuously determining the network performance, and eliminating customer involvement. The predictive indicator inherently increases customer satisfaction by removing the burden of responding to obtrusive Q&A surveys.

In general, the predictive indicator described herein relies on a network performance data set, which is captured from monitored network events. The systems and method described herein may operate using machine learning algorithms to generate a predictive indicator for an entire customer base on a daily basis. Additionally, the predictive indicator described herein provides a surrogate metric for customer experience that is based on real-time network event measurement. Additionally, the predictive indicator replaces Key Performance Indicators (KPIs) that are based on operational processes.

The systems and methods described herein are associated with a wireless network such as a Radio Access Network (RAN). A Radio Access Network (RAN) is part of a telecommunication system that utilizes a Radio Access Technology (RAT). The RAN resides between User Equipment (UE) and provides a connection to a Core Network (CN). A base station is related to a site coverage area and may include a cell site, a sector, a frequency or any other parameter associated with the RAN site that may be monitored, controlled or the combination thereof. User Equipment (UE) includes devices such as a smartphone, mobile phones, a computer, an IoT device, and other such devices. Radio Access Technologies (RATs) refers to the underlying physical connection method for a radio-based communication network. For example, a smartphone may contain several RATs such as Bluetooth, Wi-Fi, 3G, 4G, and LTE. Data flow is measured in bytes per second.

Figure 1:
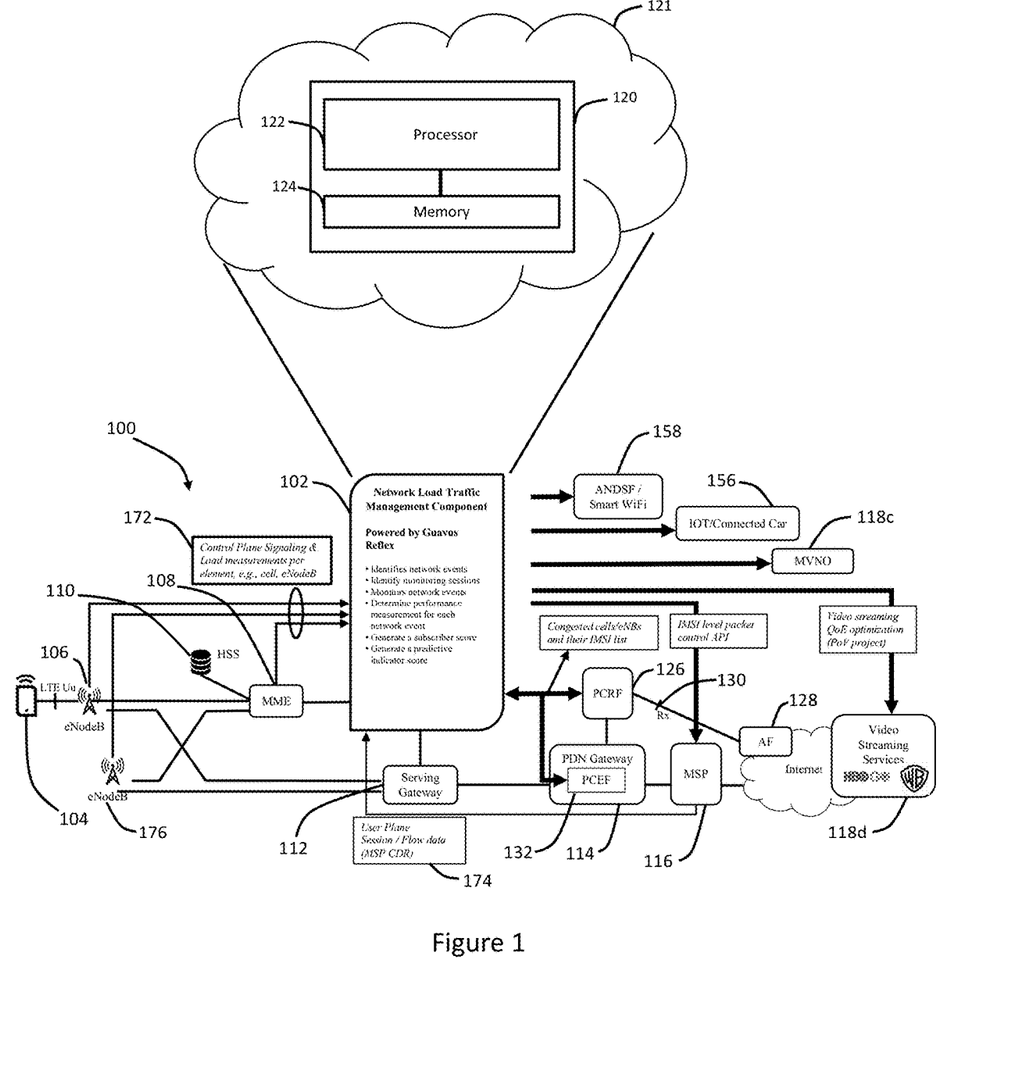
FIG. 1 shows an illustrative Radio Access Network (RAN) having a network load traffic management component.

Referring to FIG. 1, there is shown an illustrative radio access network (RAN) system 100, e.g. an LTE network, which provides mobile devices 104, e.g. User Equipment (UE), such as a smartphone with Internet connectivity. The illustrative RAN system 100 includes a network load traffic management component 102 for determining a predictive indicator based on network performance. The illustrative mobile device 104 communicates with at least one eNodeB 106. The illustrative mobile device 104 may include an International Mobile Subscriber Identity (IMSI).

More generally, the illustrative mobile device 104 may include a personal computer, a laptop, a tablet computer, or a smartphone. The mobile device 104 may be operationally coupled to a wide area network (WAN) such as the Internet by being communicatively coupled to a Radio Access Network (RAN) associated with a service provider network. The mobile device 104 may also be communicatively coupled to the WAN via a Wi-Fi (or Bluetooth) access point (not shown) that is communicatively coupled to an illustrative modem (not shown), which is communicatively coupled to the WAN.

The network load traffic management component 102 may be embodied as a network load traffic management server 120 that resides in a cloud service 121. The illustrative network load traffic management server 120 includes a server processor 122 and a server memory 124. The illustrative network load traffic management server 120 includes the network load traffic management component 102 and a database that operate on the server processor 122 and the server memory 124. The network load traffic management server 120 is communicatively coupled to the RAN.

The illustrative cloud service 121 may be embodied as one of four fundamental cloud service models, namely, infrastructure as a service (IaaS), platform as a service (PaaS), software as a service (SaaS), and network as a service (NaaS). The cloud service models are deployed using different types of cloud deployments that include a public cloud, a community cloud, a hybrid cloud, and a private cloud.

Infrastructure as a service (IaaS) is the most basic cloud service model. IaaS providers offer virtual machines and other resources. The virtual machines, also referred to as "instances," are run as guests by a hypervisor. Groups of hypervisors within the cloud operational support system support large numbers of virtual machines and the ability to scale services up and down according to customers' varying requirements. IaaS clouds often offer additional resources such as images in a virtual machine image library, raw (block) and file-based storage, firewalls, load balancers, IP addresses, virtual local area networks (VLANs), and software bundles. IaaS cloud providers supply these resources on demand from their large pools installed in data centers. For wide area connectivity, the Internet can be used or virtual private networks (VPNs) can be used.

Platform as a service (PaaS) enables cloud providers to deliver a computing platform that may include an operating system, a programming language execution environment, a database, and a web server. Application developers can develop and run their software solutions on the PaaS without the cost and complexity of buying and managing the underlying hardware and software layers. With some PaaS solutions, the system resources scale automatically to match application demand, so the cloud end user does not have to allocate resources manually.

Software as a service (SaaS) enables cloud providers to install and operate application software in the cloud. Cloud end users access the software from cloud clients. The cloud end users do not manage the cloud infrastructure and platform that runs the application. The SaaS application is different from other applications because of scalability. Higher throughput can be achieved by cloning tasks onto multiple virtual machines at run-time to meet the changing work demand. Load balancers in the SaaS application distribute work over a set of virtual machines. To accommodate a large number of cloud end users, cloud applications may be multitenant and serve more than one cloud end user organization. Some SaaS solutions may be referred to as desktop as a service, business process as a service, test environment as a service, communication as a service, etc.

The fourth category of cloud services is Network as a service (NaaS), in which the capability provided to the cloud service end user is to use a network/transport connectivity services, an inter-cloud network connectivity services, or the combination of both. NaaS involves the optimization of resource allocations by considering network and computing resources as a unified whole and traditional NaaS services include flexible and extended VPNs, and bandwidth on demand.

There are different types of cloud deployment models for the cloud based service, which include a public cloud, a community cloud, a hybrid cloud, and a private cloud. In a public cloud, applications, storage, and other resources are made available to the general public by a service provider. These services are free or offer a pay-per-use model.

The community cloud infrastructure is between several organizations from a community with common concerns, and can be managed internally or by a third-party, and hosted internally or externally; so the costs are spread over fewer users than a public cloud (but more than a private cloud).

The private cloud infrastructure is dedicated for a single organization, whether managed internally or by a third-party, and hosted internally or externally. A private cloud project requires virtualizing the business environment, and it requires that the organization reevaluate decisions about existing resources.

The hybrid cloud is a composition of two or more clouds (private, community or public) that remain unique entities but are bound together, offering the benefits of multiple deployment models. Hybrid cloud architecture requires both on-premises resources and off-site (remote) server-based cloud infrastructure. Although hybrid clouds lack the flexibility, security, and certainty of in-house applications, the hybrid cloud provides the flexibility of in-house applications with the fault tolerance and scalability of cloud-based services.

Referring back to FIG. 1, the illustrative radio network system 100 provides User Equipment 104 (UE) such as a smartphone with Internet connectivity. When a mobile device 104 has data to send to or receive from the Internet, it sets up a communication channel between itself and the Packet Data Network Gateway 114. This involves message exchanges between the UE 104 and the Mobility Management Entity (MME) 108.

In coordination with the eNodeB base station 106, the Serving Gateway 112, and the Packet Data Network Gateway 114, data plane tunnels are established between the base station 106 and the Serving Gateway 112, and between the Serving Gateway 112 and the Packet Data Network Gateway 114. The network establishes a virtual communication channel, called an Evolved Packet switched System (EPS) bearer, to connect the UE 104 and the base station 106.

For network access and service, entities in the illustrative network 100 exchange control plane messages. A specific sequence of such control plane message exchange is called a network procedure. For example, when a mobile device 104 powers up, it initiates an attach procedure with the MME 108, which includes establishing a radio connection to the base station 106. Thus, each network procedure involves the exchange of several control plane messages between two or more entities. The specifications for these are defined by the various 3GPP Technical Specification Groups.

The 3GPP R14 includes a Radio Congestion Awareness Function (RCAF), which is an element that provides a RAN User Plane Congestion Information (RUCI) to the Policy and Charging Rules Function 126 (PCRF) to enable the PCRF 126 to take the RAN 100 user plane congestion status into account for policy decisions. In operation, the RCAF integrates with RAN Operations and Maintenance (O&M) to collect the information related to UE congestion, the impacted base station 106 (eNodeB) and interrogates the MME 108 to get the impacted subscribers and services. Afterward, the RCAF updates the PCRF 126 with such information, so the PCRF 126 can make decisions or implement policies to handle the subscribers/services currently in congestion.

The Policy and Charging Rules Function (PCRF) 126 is the software node designated in real-time to determine policy rules in a multimedia network. As a policy tool, the PCRF 126 plays a central role in next-generation networks. The PCRF 126 is a software component that operates at the network core and accesses subscriber databases and other specialized functions, such as a charging system, in a centralized manner. Because it operates in real time, the PCRF 126 has an increased strategic significance and broader potential role than traditional policy engines. The PCRF 126 is the part of the network architecture that aggregates information to and from the network, operational support systems, and other sources (such as portals) in real time, supporting the creation of rules and then automatically making policy decisions for each subscriber active on the network. Such a network might offer multiple services, quality of service (QoS) levels, and charging rules.

The Application Function 128 (AF) interacts with applications or services and extracts session information from the application signaling and provides it to the PCRF 126. The Rx 130 reference point resides between AF 128 and PCRF 126. The AF 128 provides the following application session related information to the PCRF 126: Subscriber Identifier, IP address of the UE, Media Type and Format, Bandwidth, Flow description e.g. Source and Destination IP addresses and the protocol, AF Application Identifier, AF Communication Service Identifier, AF Application Event Identifier, AF Record Information, Flow Status, Priority Indicator and Emergency Indicator.

The Policy Charging and Enforcement Function 132 (PCEF) is located in the PDN Gateway 114. The PCEF 132 provides service data flow detection, user plane traffic handling, trigger control plan session management, QoS handling, service data flow measurement, and online/offline charging interactions. The PCEF 132 allows a particular data flow to pass through a PCEF only if the gating function allows. The PCEF 132 enforces the authorized QoS of service data flow according to an active Policy Control and Charging (PCC) rule. For service data flow that is subject to charging control, the PCEF 132 will allow the service data flow to pass through the PCEF 132 if and only if there is a corresponding Policy Control and Charging (PCC) rule.

The network load traffic management component 102 is communicatively coupled to one or more components of the radio access network (RAN) to detect and monitor network interactions such as the network procedures described above. Additionally, the message exchanges between the UE 104 and the Mobility Management Entity (MME) 108 can be detected and monitored by the network load traffic management component 102. Also, by way of example and not of limitation, the network load traffic management component 102 detects and monitors data planes that are established between the base station 106 and the Serving Gateway 112, and between the Serving Gateway 112 and the Packet Data Network Gateway 114. Furthermore, the network load traffic management component 102 can detect and monitor EPS bearer communication channel communications between the UE and the base stations.

A network interaction includes detecting and monitoring network events. Network events may include all requests caused by a user interaction, a user action, a network interaction and a subrequest. By way of example and not of limitation, a network interaction is the set of HTTP requests and responses, or other sequence of logically related network traffic, caused by a user visit to a single web page or interaction with page elements. Also, a network interaction may be a single HTTP request and its corresponding responses such as zero or interim responses and single final response. A network interaction may also include a user action, which is a deliberate action by the user, via configuration, invocation, or selection, to initiate a network interaction; selection of a link, submission of a form, and reloading a page are examples of user actions. Furthermore, a network interaction may include a subrequest that is not directly initiated by user action; for example, an initial response in a hypermedia format that contains embedded references to stylesheets, images, frame sources, and onload actions will cause a browser, depending on its capabilities and configuration, to perform a corresponding set of automated subrequests to fetch those references using additional network interactions.

The systems and methods described herein collect and process network interactions related to a specific customer experience. The customer experience is defined by a variety of different network events. For example, one illustrative network event includes "registrations," which refers to a UE registering itself as an authenticated device, which is authorized to invoke subscribed services. In one embodiment, the UE begins the registration process by sending a registration message to a home address or another node.

Another illustrative network event that may be stored and monitored is a Session Initiation Protocol (SIP) message network interaction. A SIP message includes requests and responses. SIP requests are codes used to establish a communication. SEP responses indicate that a SIP request succeeded or failed.

Yet another illustrative network event that may be detected and monitored includes mobility messages. Mobility messages are associated with UE attachment and handover procedures for one or more communication protocols such as the GPRS Tunneling Protocol, the Proxy Mobile IP protocol and other such protocols.

A further illustrative network event that is stored and processed includes media traffic communicated between a client device (UE) and a media server, which may be monitored or modified by a media services gateway. In another illustrative embodiment, the analysis of user and control plane data may be performed by a gateway or device other than the media service gateway such as a Gateway GPRS Service Node (GGSN), PDN Gateway (P-GW), Policy and Charging Enforcement Function (PCEF), or Deep Packet Inspection (DPI) device.

Yet a still further illustrative network event that can be stored and processed by the network load traffic management component 102 is a bearer traffic, which refers to the traffic communicated between two terminals, such as voice (or other audio), video, or other forms of streaming or real-time traffic. Bearer traffic is distinguished from control traffic or control signaling, which are used for call session setup, management, or tear down.

In operation, the network load traffic management component 102 includes a subscriber scoring module and a subscriber scoring database that operates on the server processor 122 and the server memory 124. The network load traffic management component identifies at least one network event corresponding to a RAN control plane. The network load traffic management component monitors each network event for a session time, in which each session time is associated with each subscriber interacting with the RAN. The network load traffic management component, repeatedly, determines a performance measurement for each network event associated with each session time. The performance measurement for each network event is recorded. A subscriber score is generated based on the performance measurements for each network event. A predictive indicator score is generated based on subscriber scores and behavioral analytics associated with each subscriber.

Figure 2A:
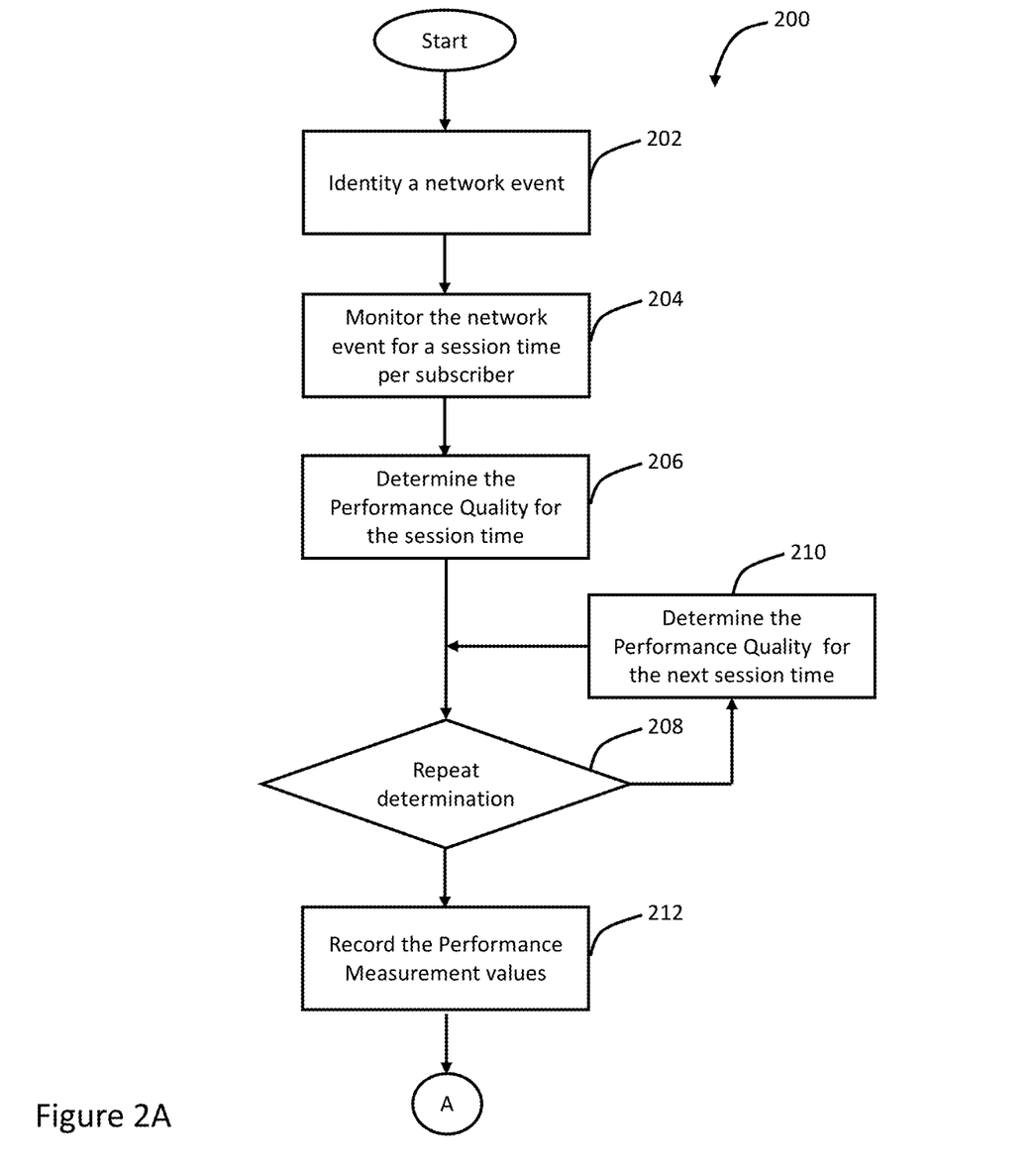
FIG. 2A and FIG. 2B shows an illustrative flowchart of a method for determining a predictive indicator based on network performance.
Figure 2B:
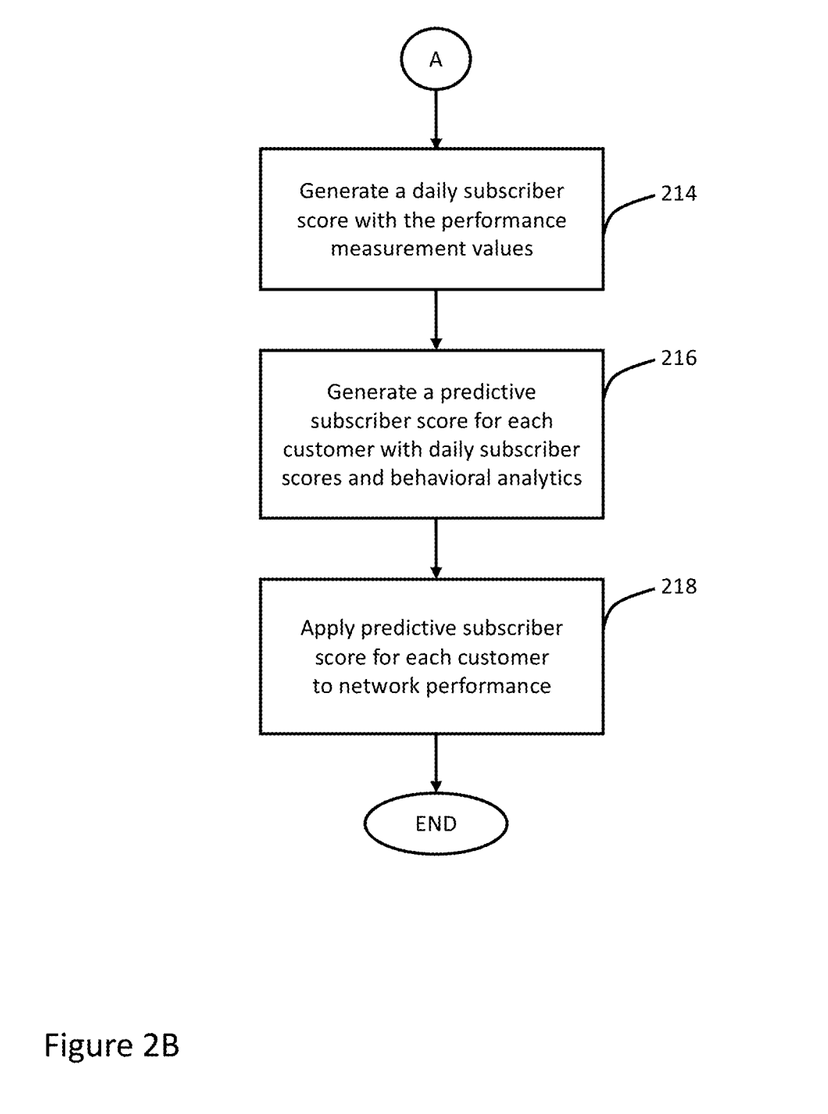

Referring to FIG. 2 there is shown a flowchart of a method for determining a predictive indicator based on network performance using the system described in FIG. 1. In the illustrative embodiment, the illustrative RAN 100 is associated with a service provider, mobile carrier, cellular company, mobile network operator or any other such provider of wireless communication services that owns elements or components necessary to sell and deliver wireless services.

The illustrative RAN 100 includes a plurality of base stations such as eNodeB base station 106 described above. Each base station has a coverage area. A plurality of mobile devices 104 are communicatively coupled to the RAN 100 and the corresponding base stations 106 and 176. The network load traffic management component 102 is communicatively coupled to the RAN 100. The network load traffic management component 102 includes a subscriber scoring module and a subscriber scoring database that operates on the server processor 122 and a server memory 124.

In operation, the method 200 determines a predictive indicator based on network performance at regular intervals. The method is initiated at block 202, in which one or more network events or network interactions are identified. Network events and network interactions are associated with the user plane, the control plane or the combination thereof.

The user plane carries the network user traffic. The user plane is also referred to as data plane, carrier plane or bearer plane; the user plane contains data regarding the content that is sent or received by the user, e.g. text messages, voice, photos, videos and websites.

The control plane carries signaling traffic that is originated from or destined for a router. Control plane contains the data regarding management of the network. Control plane makes decisions about where traffic is sent. The control plane functions include the system configuration, management, and exchange of routing table information.

In the illustrative embodiment, the illustrative network load traffic management component 102 detects and monitors the network events that have been selected or identified at block 202. By way of example and not of limitation, the network event may include at least one of a registration, a SIP message, a plurality of media traffic and plurality of bearer traffic.

The method then proceeds to block 204 where the network events are associated with a session time by the illustrative network load traffic management component 102. A session time has a corresponding time period that is defined by a fixed interval time period, a variable time period or a combination thereof. Additionally, each session time is associated with each subscriber interacting with the RAN 102.

An illustrative session time having a variable time period may be defined as "variable" based on the variable duration of voice call, the variable duration of a gaming session, the variable duration of a streaming video session, or any other such variable time period for user selected data traffic. A fixed time interval period may be a fixed time interval during which the network events are monitored in a regular manner that is determined by a fixed time interval. Also, the session may be a combination of a variable time period and fixed time interval; for example, a video call may include detecting and monitoring the video quality at fixed intervals and detecting and monitoring the voice call quality at fixed intervals—additionally, voice and video quality may be detected and monitored for the duration of the video call.

At blocks 206, 208 and 210, the method proceeds to repeatedly determine a performance quality measurement for each network event associated with each session time. At block 206, an illustrative performance measurement is used to determine the "quality" of the illustrative session time. The term "quality" as used herein is more of a generalized definition such as a degree of performance quality or degree of performance excellence. However, the term "quality" may also be used to refer to Quality of Service (QoS), which is a term of art that refers to traffic prioritization and resource control mechanisms rather than the achieved service quality definition. More particularly, Quality of Service is the ability to provide a different priority to different applications, users, or data flows to guarantee a certain level of performance to a data flow.

In one illustrative embodiment, a performance quality of the network events or network interactions is performed. In another illustrative embodiment, a Quality of Service is monitored as a proxy for performance quality; thus, if the QoS is satisfied then the performance quality is "high" and if the QoS is not satisfied then the performance quality is "low." This distinction will be clear to those of ordinary skill in the art having the benefit of this disclosure.

At decision diamond 208 and block 210, the determination of performance quality is determined for the next session time. The decision diamond 208 is necessary to determine the type of session time, namely, a variable session time, a fixed time interval or a combination thereof.

At block 212, the performance quality measurement is then recorded for each network event over a timeline. Additionally, each performance measurement is associated with the session times for each subscriber.

At block 214, a subscriber score is generated based on the plurality of performance measurements for each network event.

At block 216, the network load traffic management component then proceeds to generate a predictive indicator score based on a plurality of subscriber scores and a plurality of behavioral analytics associated with each subscriber. In the illustrative embodiment, the behavioral analytics include a mobility attribute. More specifically, the mobility attribute includes at least one of a location for each mobile device, an activity level for each mobile device, at least one used service associated with each mobile device, at least one tariff associated with each mobile device and a revenue associated with each mobile device.

In one embodiment, the predictive indicator score may be associated with a net promoter score (NPS) to generate a "predicted" NPS as described in further detail in FIG. 4 below. Additionally, the predictive indicator score for each subscriber may be used to evaluate network performance of the RAN 100.

In the illustrative embodiment, the behavioral analytics includes a mobility attribute. More specifically, the mobility attribute includes at least one of a location for each mobile device, an activity level for each mobile device, at least one used service associated with each mobile device, at least one tariff associated with each mobile device and a revenue associated with each mobile device.

Figure 3:
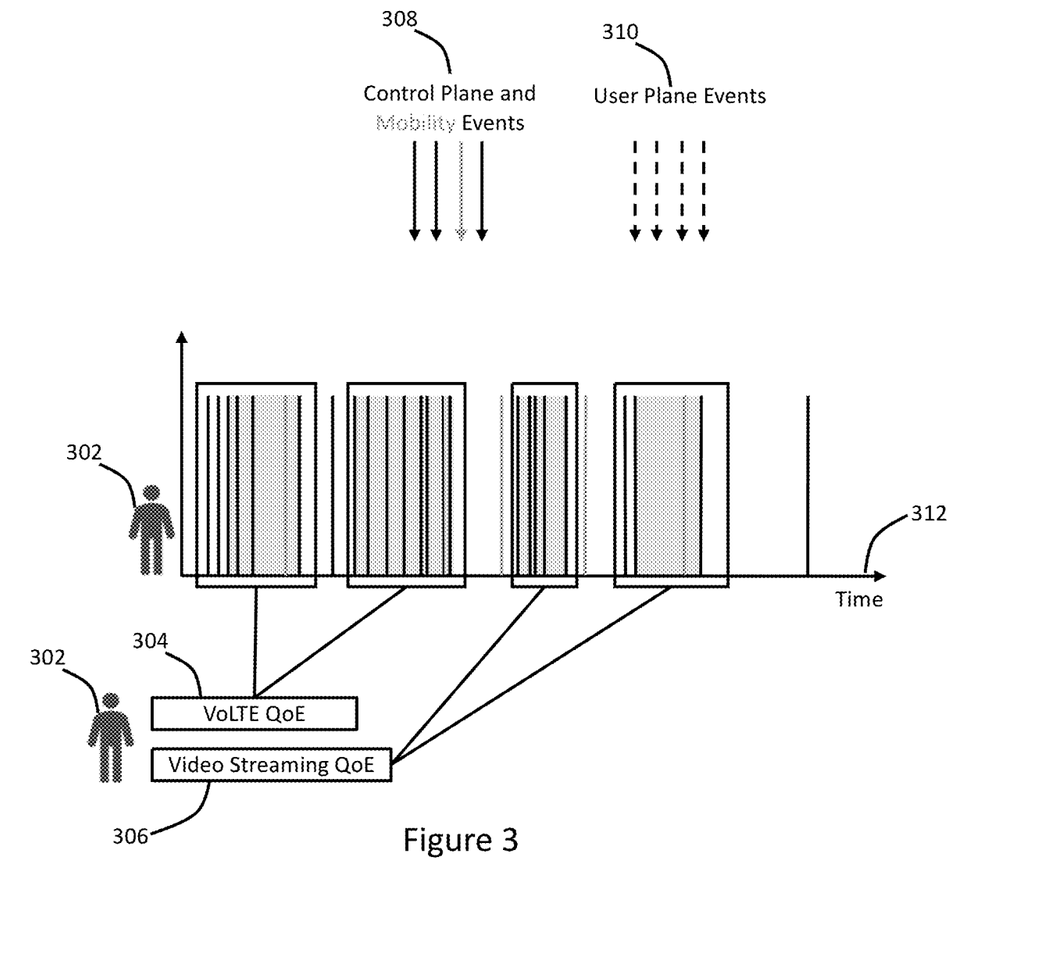
FIG. 3 shows a block diagram of an illustrative performance quality measurement generated over a timeline for two subscriber applications.

Referring now to FIG. 3, there is shown a block diagram of an illustrative performance quality measurement generated over a timeline for two subscriber applications. FIG. 3 provides a further detailed description of the operations performed in blocks 206, 208, 210 and 212 which are described above in FIG. 2.

In the illustrative embodiment, network interactions for a specific subscriber 302 experience are collected and processed for a VoLTE application 304 and a video streaming application 306. The network interactions include network events such as control plane and mobility events 308 and user plane events 310. By way of example and not of limitation, the illustrative network events include registrations, SIP messages, mobility messages, media and bearer traffic as described above.

The first illustrative application is VoLTE application 304, which includes network events related to Voice over LTE (VoLTE). VoLTE is a feature that supports voice calls over a 4G network using 4G compatible devices. VoLTE allows a subscriber to remain connected to the 4G network during a voice call, which enables a subscriber to continue to use 4G mobile data while making and receiving calls. The second illustrative application is a video streaming application 306 to mobile device 104.

These illustrative network events are associated with a session time and a timeline 312 for each customer. For example, during the session time, which is the call duration, all of the SIP messages during a VoLTE call are grouped and added to the bearer voice packets, and the mobility message RAN handoffs are analyzed. A performance quality measurement is generated for the session time. For example, the performance quality measurement may be based on the success or failure of the tracked networks events, which would be a binary score. Also, the performance quality measurement may be based on the overall fidelity perception, which may have a much broader scoring range. The resulting performance measurements are then associated with the timeline 312 of calculated performance quality measurements for each application and for each subscriber.

Figure 4:
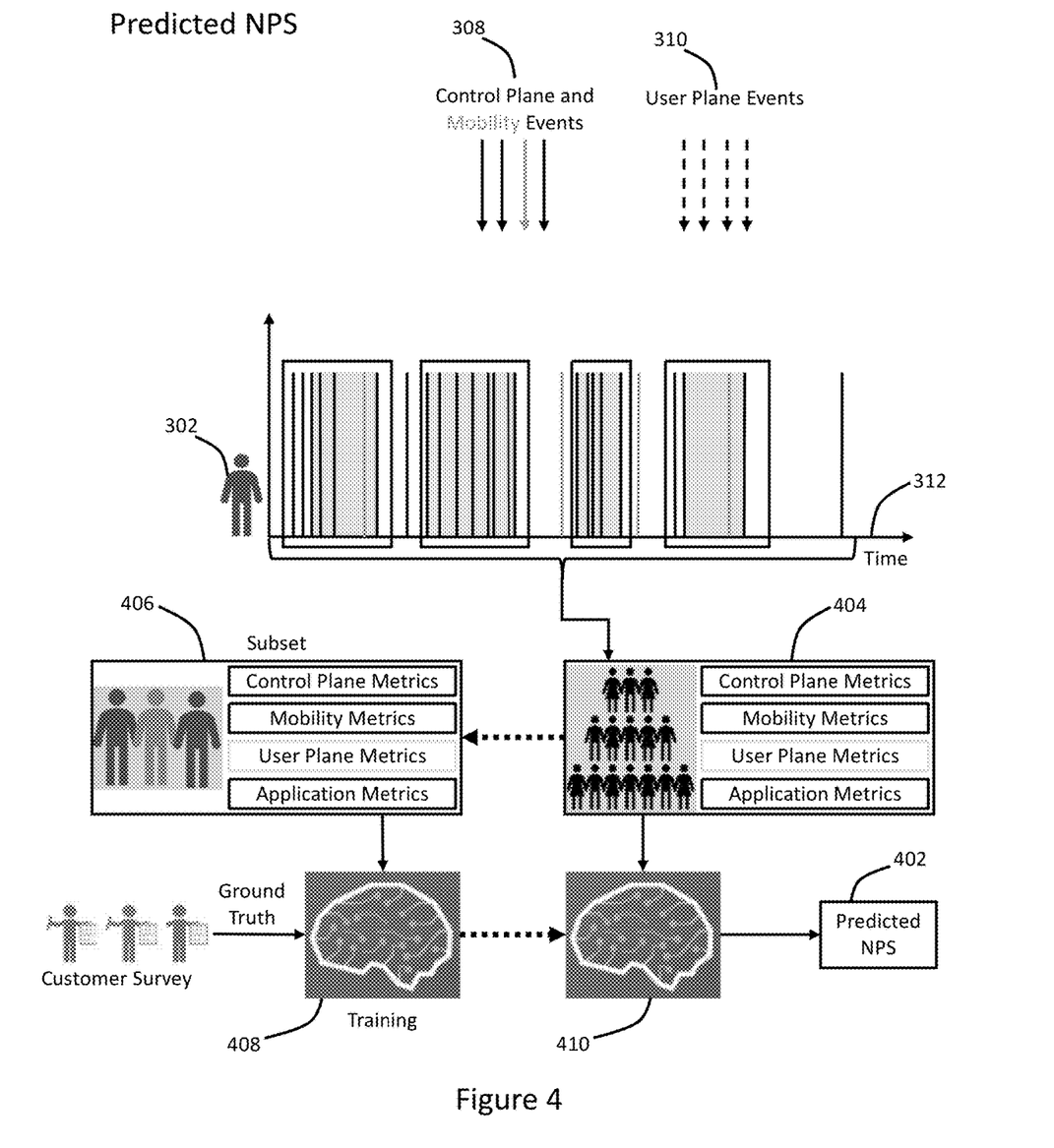
FIG. 4 shows a block diagram for generating a predictive indicator based on network performance.

Referring to FIG. 4 there is shown a block diagram for generating a predictive indicator based on network performance. The network load traffic management component 102 generates the predictive indicator as described in blocks 214 and 216 shown in FIG. 2. A more specific illustrative embodiment for generating the predictive indicator is presented below.

In this illustrative embodiment, the predictive indicator score is associated with a net promoter score (NPS) to generate a predicted NPS score 402. NPS is a customer "perception" of satisfaction. Perceptions are based on recent experience and historical experience. If a subscriber has twenty-nine (29) days of very good quality, then one bad day will not result is turning a Promoter into a Detractor. Conversely, if a subscriber has been a Detractor historically, then it will take many days or weeks of high Calculated NPS impact to convert the Customer from a Detractor to a Supporter.

In this illustrative embodiment, a daily subscriber score is generated for a session time with the performance measurements associated with each network event for each subscriber. More particularly, the daily subscriber score is generated by weighing the individual subscriber scores that were calculated daily. The weighing of the scores is based on the network interactions and/or network events and subscriber's use of specific service over a period of time, e.g. last 7 or last 30 days. In the illustrative embodiment, highly interactive applications and frequently used services are scored more highly than less frequently used services or background services, which have a lower weighted score.

At block 404, the network load traffic management component 102 then proceeds to store and analyze the subscriber scores, e.g. daily subscriber score.

At block 406, the behavioral analytics are also associated with each subscriber. Behavioral analytics may be applied to subscribers to create a group classification based on an illustrative thirty (30) day subscriber history. The group classification at block 406 is a subset of the subscriber scores stored in block 404.

In the illustrative embodiment, the behavioral analytics includes a mobility attribute, which associates location with the mobile device 104. Behavioral analytics may also be associated with an activity level for each mobile device, a subscriber used service associated with each mobile device, a tariff associated with each mobile device and a revenue associated with each mobile device The classified groups may then be analyzed to develop a predictive NPS model for each group classification. At block 408, ground truth for the predictive NPS model is determined from a subset of true NPS surveys, which are used to train the NPS prediction model. In the illustrative embodiment, a unique NPS predictive model may be associated with each group classification. At block 410, the ground truth may also be applied to the more generalized daily subscriber scores.

A database associated with the network load traffic management module 102 stores and manages the predictive NPS scores, which are based on network performance and customer experiences. The database, which is based on the daily subscriber score, may be made available to drive programs and actions such as customer lifecycle management, churn prevention actions, customer communications and network performance. The predicted NPS scores may also become a company-wide single network performance metric, against which all of the internal teams may be objectively measured.

The systems and methods described herein generate a predictive indicator based on network performance. The predictive indicator represents customer satisfaction. For wireless networks, a subscriber rating or score may represent customer satisfaction. The predictive indicator described herein relies on a network performance data set, which is captured from monitored network events. The systems and method described herein operate using machine learning algorithms to generate a predictive indicator for an entire customer base on a daily basis. The predictive indicator described herein provides a surrogate metric for customer experience that is based on real-time network event measurements.

It is to be understood that the detailed description of illustrative embodiments is provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A method for determining a predictive indicator based on network performance at regular intervals for each of a plurality of subscribers, the method comprising:
providing a radio access network (RAN) associated with a service provider network, the RAN including a plurality of base stations, in which each base station has a coverage area;
enabling a plurality of mobile devices to be communicatively coupled to the RAN;
communicatively coupling a network load traffic managemement compononent to the RAN, wherein the network load traffic management component includes a subscriber scoring module and a subscriber scoring database that operates on a server processor and a server memory;

identifying, with the network load traffic management component, at least one network event corresponding to a RAN control plane;

monitoring, with the network load traffic management component, each network event for a session time wherein each session time is associated with each subscriber interacting with the RAN;

repeatedly, determining a performance measurement for each network event associated with each session time;

recording, with the network load traffic management component, the performance measurement for each network event over a timeline, wherein each performance measurement is associated with each of the plurality of session times for each subscriber;

generating, with the network load traffic management component, a subscriber score based on the plurality of performance measurements for each network event; and generating, with the network load traffic management component, a predictive indicator score based on a plurality of subscriber scores and a plurality of behavioral analytics associated with each subscriber.

2. The method of claim 1 wherein the behavioral analytics includes a mobility attribute.

3. The method of claim 2 wherein the mobility attribute includes at least one of a location for each mobile device, an activity level for each mobile device, at least one used service associated with each mobile device, at least one tariff associated with each mobile device and a revenue associated with each mobile device.

4. The method of claim 1 wherein the predictive indicator score is associated with a net promoter score.

5. The method of claim 1 wherein the session time includes a call duration.

6. The method of claim 1 wherein the predictive indicator score for each subscriber is used to evaluate a network performance of the radio access network.

7. The method of claim 1 wherein the network event includes at least one of a registration, a SIP message, a plurality of media traffic and a plurality of bearer traffic.

8. The method of claim 1 wherein the performance measurement includes a quality of service.

9. A system for determining a predictive indicator based on network performance at regular intervals for each of a plurality of subscribers, the system comprising:

a radio access network (RAN) associated with a service provider network, the RAN including a plurality of base stations, in which each base station has a coverage area;

a plurality of mobile devices to be communicatively coupled to the RAN;

a network load traffic management component communicatively coupled to the RAN, wherein the network load traffic management component includes a subscriber scoring module and a subscriber scoring database that operates on a server processor and a server memory;

the network load traffic management component identifies at least one network event;

the network load traffic management component monitors each network event for a session time, in which each session time is associated with each subscriber interacting with the RAN;

the network load traffic management component repeatedly determines a performance measurement for each network event associated with each session time;

the network load traffic management component records the performance measurement for each network event over a timeline, wherein each performance measurement is associated with each of the plurality of session times for each subscriber;

the network load traffic management component generating a subscriber score based on the plurality of performance measurements for each network event; and the network load traffic management component generating a predictive indicator score based on a plurality of subscriber scores and a plurality of behavioral analytics associated with each subscriber.

10. The system of claim 9 wherein the behavioral analytics include a mobility attribute, wherein the mobility attribute further includes at least one of a location for each mobile device, an activity level for each mobile device, at least one used service associated with each mobile device, at least one tariff associated with each mobile device and a revenue associated with each mobile device.

11. The system of claim 9 wherein the predictive indicator score is associated with a net promoter score.

12. The system of claim 9 wherein the session time includes a call duration.

13. The system of claim 9 wherein the predictive indicator score for each subscriber is used to evaluate a network performance of the radio access network.

14. The system of claim 9 wherein the network event includes at least one of a registration, a SIP message, a plurality of media traffic and a plurality of bearer traffic.

15. The system of claim 9 wherein the performance measurement includes a quality of service.

16. A system for determining a predictive indicator based on network performance at regular intervals for each of a plurality of subscribers, the system comprising:

a radio access network (RAN) associated with a service provider network, the RAN including a plurality of Base stations, in which each Base station has a coverage area;

a plurality of mobile devices to be communicatively coupled to the RAN;

a network load traffic management component communicatively coupled to the RAN, wherein the network load traffic management component includes a subscriber scoring module and a subscriber scoring database that operates on a server processor and a server memory;

the network load traffic management component identifies at least one network event corresponding to a RAN control plane;

the network load traffic management component monitors each network event for a session time, in which each session time is associated with each subscriber interacting with the RAN;

the network load traffic management component repeatedly determines a performance measurement for each network event associated with each session time;

the network load traffic management component records the performance measurement for each network event over a timeline, wherein each performance measurement is associated with each of the plurality of session times for each subscriber;

the network load traffic management component generating a daily subscriber score based on the plurality of performance measurements for each network event, wherein the performance measurement includes a Quality of Service parameter;

the network load traffic management component generating a predictive indicator score based on a plurality of daily subscriber scores and a plurality of behavioral analytics associated with each subscriber; and wherein the behavioral analytics include a mobility attribute, wherein the mobility attribute further includes at least one of a location for each mobile device, an activity level for each mobile device, at least one used service associated with each mobile device, at least one tariff associated with each mobile device and a revenue associated with each mobile device.

17. The system of claim 16 wherein the predictive indicator score is associated with a net promoter score.

18. The system of claim 16 wherein the session time includes a call duration.

19. The system of claim 16 wherein the predictive indicator score for each subscriber is used to evaluate a network performance of the radio access network.

20. The system of claim 16 wherein the network event includes at least one of a registration, a SIP message, a plurality of media traffic and a plurality of bearer traffic.

* * * * *